United States Patent
Wang et al.

(10) Patent No.: US 9,788,022 B2
(45) Date of Patent: Oct. 10, 2017

(54) SYSTEMS AND METHODS FOR OPTIMIZING DIGITAL ADVERTISEMENT INSERTION

(71) Applicant: Verizon Patent and Licensing Inc., Arlington, VA (US)

(72) Inventors: Dongchen Wang, Concord, MA (US); Marcelo D. Lechner, Burlington, MA (US); Rory W. Britt, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 100 days.

(21) Appl. No.: 14/868,602

(22) Filed: Sep. 29, 2015

(65) Prior Publication Data
US 2017/0094324 A1    Mar. 30, 2017

(51) Int. Cl.
*H04N 7/10*      (2006.01)
*H04N 21/234*    (2011.01)
*H04N 21/845*    (2011.01)
*H04N 21/81*     (2011.01)
*H04N 21/236*    (2011.01)

(52) U.S. Cl.
CPC .  *H04N 21/23424* (2013.01); *H04N 21/23614* (2013.01); *H04N 21/812* (2013.01); *H04N 21/8455* (2013.01); *H04N 21/8456* (2013.01)

(58) Field of Classification Search
CPC ......... H04N 21/23424; H04N 21/8455; H04N 21/23614; H04N 21/812; H04N 21/8456
USPC .......................................................... 725/32
See application file for complete search history.

(56) References Cited

U.S. PATENT DOCUMENTS

| | | | | |
|---|---|---|---|---|
| 5,600,366 A | * | 2/1997 | Schulman | H04N 7/165 348/E7.063 |
| 5,859,660 A | * | 1/1999 | Perkins | H04N 21/23611 348/584 |
| 8,752,085 B1 | * | 6/2014 | Brueck | H04L 65/601 725/32 |
| 2004/0244058 A1 | * | 12/2004 | Carlucci | G06F 3/0482 725/135 |
| 2009/0161762 A1 | * | 6/2009 | Jun | H04N 21/234327 375/240.16 |
| 2009/0210894 A1 | * | 8/2009 | Reckless | H04N 7/163 725/32 |

(Continued)

OTHER PUBLICATIONS

Moylan, Brian. The Most Annoying Thing About Reality TV. Gawker. Mar. 3, 2011. <http://gawker.com/5781717/the-most-annoying-thing-about-reality-tv>.*

*Primary Examiner* — Michael B Pierorazio

(57) ABSTRACT

An exemplary method includes a digital advertisement insertion optimization system accessing data that indicates a playback return position at which playback of a media program is to be resumed following insertion of an advertisement in the media program when a first media file comprising the media program encoded in a first media format is used for playback of the media program, analyzing a second media file comprising the media program encoded in a second media format to identify a set of key frames within the second media file, selecting a key frame from the identified set of key frames; and generating data that indicates a new playback return position at which playback of the media program is to be resumed following insertion of an advertisement when the second media file is used for playback of the media program.

21 Claims, 8 Drawing Sheets

(56) References Cited

U.S. PATENT DOCUMENTS

| | | | | |
|---|---|---|---|---|
| 2010/0129056 A1* | 5/2010 | Connery | .............. | G11B 27/034 386/241 |
| 2014/0020013 A1* | 1/2014 | Dilorenzo | ............ | H04N 21/812 725/32 |
| 2014/0165095 A1* | 6/2014 | Miller | .............. | H04N 21/44016 725/34 |
| 2015/0281746 A1* | 10/2015 | Lam | ................... | H04N 21/2368 725/116 |

* cited by examiner

SYSTEMS AND METHODS FOR OPTIMIZING DIGITAL ADVERTISEMENT INSERTION

BACKGROUND INFORMATION

Digital advertisement insertion ("DAI") systems enable media content distributors to switch from a presentation of a digital media program to a presentation of a digital media advertisement and back to the digital media program with essentially no interruption in a continuous presentation of digital media content. For example, at a certain point during a presentation of a digitally distributed on-demand television program, a distributor may wish to stop presenting the program, switch to and present an advertisement, and then switch back to and continue presenting the program, all without an appreciable disruption in the presentation of the program and advertisement content.

DAI systems may receive externally-defined instructions in the form of one or more out-of-band signaling points that indicate when during a presentation of a media program to switch to an advertisement, and at what point in the media program to return to after presenting the advertisement. A signaling point may indicate a breakaway timestamp and a return timestamp. The breakaway timestamp indicates a time within the presentation of the digital media program at which the DAI system should switch to a digital advertisement, and the return timestamp indicates a time within the media program at which the DAI system should resume the presentation of the media program following the digital advertisement.

Many digital media programs are encoded and distributed using a Moving Picture Expert Group ("MPEG") MPEG-2 coding format (e.g., H.262). However, media content encoded using an MPEG-2 coding format may require more resources (e.g., storage space, bandwidth, etc.) to distribute to end users than other coding formats, such as MPEG-4 coding formats (e.g., H.264). Consequently, media distributors may achieve a more efficient distribution of content by transcoding MPEG-2 coded media content into MPEG-4 coded media content and distributing the MPEG-4 coded media content.

Due to differences between MPEG-2 and MPEG-4 coding formats, DAI signaling points originally intended for use with MPEG-2 coded media content may provide an undesirable viewing experience when applied to MPEG-4 versions of the media content. For example, a return from a presentation of a digital advertisement to a presentation of a media program in the MPEG-4 format at a signaling point originally intended for use with MPEG-2 coded media content may cause the presentation of the media program in the MPEG-4 format to include undesirable content. For instance, the presentation of the media program may include frozen, incomplete, and/or distorted video and/or audio content, which may degrade a viewer's viewing experience.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
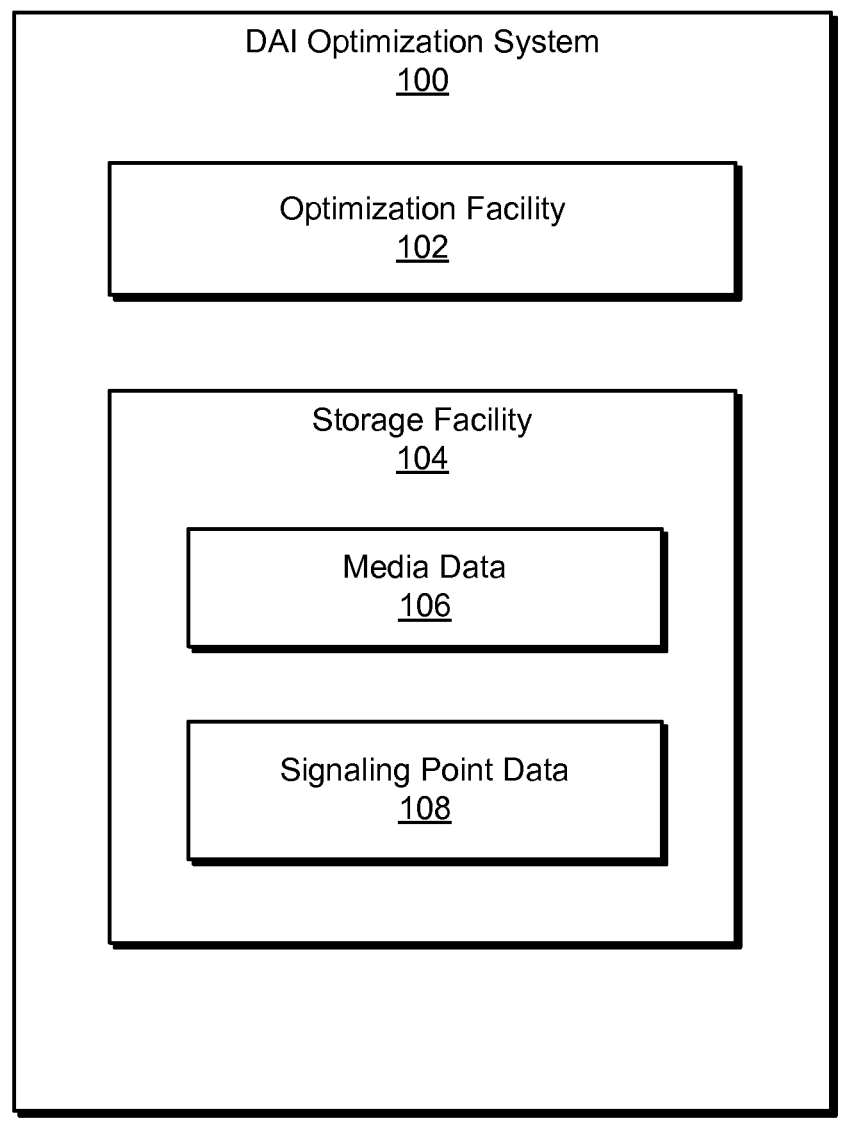
FIG. 1 illustrates an exemplary DAI optimization system according to the principles described herein.

Systems and methods for optimizing digital advertisement insertion are disclosed herein. In certain examples, as will be described in more detail below, a DAI optimization system may access data representative of an advertisement insertion signaling point for a first media file comprising a media program encoded in a first media format (e.g., an MPEG-2 format). The DAI optimization system may also analyze a second media file comprising the media program encoded in a second media format (e.g., an MPEG-4 format) to identify a set of key frames (e.g., instantaneous decoder refresh ("IDR") frames) within the second media file. The DAI optimization system may then select, based on the data representative of the advertisement insertion signaling point, a key frame from the identified set of key frames. The DAI optimization system may then generate, based on the selected key frame in the second media file, data representative of a new advertisement insertion signaling point for the second media file.

To illustrate, the DAI optimization system may access data representative of an advertisement insertion signaling point that indicates a playback return position at which playback of a media program is to be resumed following insertion of an advertisement in the media program when a first media file comprising the media program encoded in a first media format (e.g., an MPEG-2 format) is used for playback of the media program. The DAI optimization system may also analyze a second media file comprising the media program encoded in a second media format (e.g., an MPEG-4 format) to identify a set of key frames (e.g., IDR frames) within the second media file. The DAI optimization system may then select, based on the data representative of the advertisement insertion signaling point, a key frame from the identified set of key frames. The DAI optimization system may then generate, based on the selected key frame in the second media file, data representative of a new advertisement insertion signaling point that indicates a new playback return position at which playback of the media program is to be resumed following insertion of an advertisement in the media program when the second media file is used for playback of the media program. In certain examples, the new playback return position temporally precedes the selected key frame by at most a predetermined amount of time.

As used herein, a "key frame" includes a portion of a coded media data stream that may be coded and/or decoded without reference to a previous and/or a subsequent portion of the coded media data stream. For example, a key frame in a coded media data stream may include any frame, picture, slice, or other portion of the coded media data stream that may be decoded (e.g., by a media coder/decoder ("media codec")) without reference to another portion of the coded media stream and in a standalone manner that supports an intended or desirable presentation of digital media content. Examples of key frames include, but are not limited to, intra-frames, I-Frames, IDR frames, and I-Slices.

As used herein, "DAI" may refer to any form of digital and/or dynamic advertisement insertion in which advertising content is inserted into a presentation of media content (e.g., by inserting advertising content at a start, at a location within, and/or at an end of a playback of a media program). For example, DAI may refer to dynamic advertisement insertion as used in impression-based video advertisement insertion technologies, on-demand distribution and/or playback technologies (e.g., video-on-demand technologies), or any other suitable media content distribution and/or playback technologies.

Various benefits may be realized in accordance with the methods and systems described herein. For example, optimization of DAI signaling points for a media file that includes a media program encoded in a particular media format may allow content distributors to effectively continue DAI when the media file is used for presentation of the media program, without introducing undesirable content and/or interruptions into the presentation. In certain examples, optimization of DAI signaling points for MPEG-4 files may allow content distributors to realize efficiencies (e.g., reduced bandwidth and storage requirements) associated with distributing content as MPEG-4 coded content instead of and/or in addition to MPEG-2 coded content, while continuing to take advantage of the advertising opportunities of DAI. These efficiencies and advantages may be realized with only minimal or no disruption to digital content intake, processing, and distribution workflows of a content distributor. In certain implementations, for example, optimization of DAI signaling points, as described herein, may not require modification of a media file comprising a media program encoded in a media format. Moreover, optimization of DAI signaling points, as described herein, may allow content distributors to maximize DIA efficiencies and/or opportunities in a device landscape in which devices capable of playing MPEG-2 coded content have a larger market share than devices capable of playing MPEG-4 coded content. Methods and systems described herein may allow consumers of digital media content to experience a continuous presentation of media programming and digitally inserted advertisement content regardless of the media coding format used for distribution of the media programming. In this or a similar manner, methods and systems described herein may provide one or more improvements to digital media content distribution, digital media content presentation, and/or DAI technologies. These and/or additional or alternative benefits that may be provided by exemplary methods and systems described herein will be made apparent by the following description.

FIG. 1 illustrates an exemplary DAI optimization system ("system 100") that may optimize DAI signaling points for media programs coded in various media coding formats. While certain exemplary methods and systems described herein are described with respect to optimizing DAI for MPEG-4 coded media programs, it will be recognized that the methods and systems described herein may additionally or alternatively be used to optimize DAI for other media coding formats.

As shown in FIG. 1, system 100 may include, without limitation, an optimization facility 102 and a storage facility 104 selectively and communicatively coupled to one another. It will be recognized that although facilities 102 and 104 are shown to be separate facilities in FIG. 1, any of facilities 102 and 104 may be combined into fewer facilities, such as into a single facility, or divided into more facilities as may serve a particular implementation. Additionally or alternatively, one or more of the facilities 102 and 104 may be omitted from and external to system 100 in other implementations. For example, storage facility 104 may be external of and communicatively coupled to system 100 in certain alternative implementations. Facilities 102 and 104 of system 100 may include or be otherwise implemented by one or more physical computing devices specifically configured to perform one or more of the operations described herein. In such implementations, system 100 may be referred to as a computer-implemented system 100.

Storage facility 104 may maintain media data 106, which may include data representative of media content that is discoverable and/or accessible through a media service. As used herein, the term "media content" may refer to any form of media that may be distributed through a media service and discovered, accessed, and/or consumed by a user of the media service. Media content may include discrete instances of media, which may be referred to as media programs. The term "media program" may refer to any television program, on-demand media program (e.g., video-on-demand media program), pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of the media service. Such media programs that are made available for user consumption through a media service may be accessed and/or played back by an appropriately configured user computing device (e.g., a media player device) for presentation to a user.

Media data 106 may represent actual media content and/or information about the media content. For example, media data 106 may include metadata (e.g., information about genre, cast, title, playback duration, release date, chaptering information, etc.) and/or enriched metadata (e.g., user-defined tags, ratings, etc.) for the media content. In certain examples, media data 106 may represent on-demand media content and/or information about media programs included in a repository of on-demand media content.

Media data 106 may represent media content encoded in any coding format. In certain examples, media data 106 may include media files that include encodings of media programs in various media coding formats. For example, media data 106 may include a first media file that contains a media program encoded in an MPEG-2 coding format, and a second media file that contains the same media program encoded in an MPEG-4 coding format. In some examples, the second media file may be a transcoded version of the first media file. As used herein, a "media file" may refer to one or more data files that contain an encoded media program. For example, a media program may be encoded into a single data file, or the media program may be split across multiple data files.

Storage facility 104 may additionally maintain signaling point data 108, which may include data representative of one or more advertisement insertion signaling points (also referred to as "signaling points" herein). As used herein, "advertisement insertion signaling points" indicate temporal positions within media files where a DAI system may be instructed to insert digital advertising content. A signaling point may indicate one or more temporal positions (e.g., playback times) within a presentation of a media program encoded in a media format where a DAI system should break away from a presentation of the media program and/or resume the presentation of the media program. These may respectively be called "playback breakaway positions" and "playback return positions." Each signaling point may include one or more playback breakaway positions and/or one or more playback return positions. In certain implementations, these positions may be represented by one or more presentation timestamps ("PTS").

Signaling point data 108 may be associated with one or more media programs and/or media files stored as media data 106 in storage facility 104. For example, signaling point data 108 may include data representative of one or more signaling points associated with a first media file including a media program encoded in a first media format (e.g., MPEG-2) and data representative of one or more signaling points associated with a second media file including a second media program encoded in a second media format (e.g., MPEG-4).

Signaling point data 108 may include data representative of signaling points associated with media files that contain different encodings of a media program. For example, signaling point data 108 may include data representative of a signaling point that indicates a playback return position at which playback of a media program is to be resumed following insertion of an advertisement in a media program when a first media file containing the media program encoded in a first media format (e.g., an MPEG-2 format) is used for playback of the media program. Signaling point data 108 may also include data representative of an advertisement insertion signaling point that indicates a different playback return position at which playback of the media program is to be resumed following insertion of an advertisement in the media program when a second media file containing the media program encoded in a second media format (e.g., an MPEG-4 format) is used for playback of the media program. Such signaling point data 108 may be generated in any of the ways described herein and stored as signaling point data 108 for use by a DAI system.

Storage facility 104 may store signaling point data 108 in any suitable way and in any suitable format. In some implementations, signaling point data 108 may include one or more signaling point reference data records. A signaling point reference data record may include one or more files that include signaling point data. In certain examples, a signaling point reference data record may include one or more comma separated values ("CSV") files and/or edit decision list ("EDL") files. In some implementations, the signaling point data associated with one encoding of a media program may be stored in a separate signaling point reference data record from the signaling point data associated with a second encoding of the media program. For example, an MPEG-2 encoding of a media program may be associated with a first file "CSV-A", while an MPEG-4 encoding of the same media program may be associated with a second file "CSV-B."

Storage facility 104 may maintain additional or alternative data as may serve a particular implementation. Data maintained by storage facility 104 may be accessed by system 100 from any suitable source, including a source internal or external to system 100. Thus, while storage facility 104 is shown to be within system 100 in FIG. 1, in alternative embodiments, storage facility 104 may be external of system 100.

Signaling points intended for use with one encoded instance of a media program (e.g., a media file encoded in an MPEG-2 format) may not provide optimal advertising insertion points for an instance of the media program encoded in a different media format (e.g., a media file encoded in an MPEG-4 format). Differences between coding formats (e.g., different key frame positions) may cause a DAI system to present undesirable content when applying DAI to a second media file encoded in a second media format file using a signaling point intended for use with a first media file encoded in a first media format. Systems and methods described herein may optimize DAI such as by using a signaling point intended for use with a first media file encoded in a first media format to generate a new signaling point optimized for use with a second media file encoded in a second media format. The new signaling point may be provided to and used by a DAI system to apply DAI to the second media file in a manner that avoids presenting undesirable content.

Optimization facility 102 may perform any of the advertisement insertion signaling point optimization operations described herein to optimize an advertisement insertion signaling point. For example, optimization facility 102 may access data representative of an advertisement insertion signaling point for a first media file comprising a media program encoded in a first media format. Optimization facility 102 may also analyze a second media file comprising the media program encoded in a second media format. Optimization facility 102 may then select, based on the advertisement insertion signaling point for the first media file, a key frame in the second media file. Optimization facility 102 may then generate, based on the selected key frame in the second media file, data representative of a new advertisement insertion signaling point that is optimized for the second media file. Examples of optimization facility 102 performing such operations will now be described in more detail.

As mentioned, optimization facility 102 may access data representative of an advertisement insertion signaling point for a first media file comprising a media program encoded in a first media format. For example, optimization facility 102 may access data representative of an advertisement insertion signaling point that indicates a playback return position at which playback of a media program is to be resumed following insertion of an advertisement in the media program when the first media file comprising the media program encoded in the first media format (e.g., MPEG-2) is used for playback of the media program.

Optimization facility 102 may access data representative of the advertisement insertion signaling point in any suitable manner, such as by accessing signaling point data 108 maintained by storage device 104. To illustrate, optimization facility 102 may access a signaling point reference data record "$CSV_0$" maintained by storage facility 104. The signaling point reference data record may include data representative of an advertisement insertion signaling point associated with a first media file containing a media program encoded in an MPEG-2 format, and the advertisement insertion signaling point may indicate a playback return position represented as a PTS of 00:07:56.333. In this example, when the first media file is used to present the media program, the DAI system would be instructed to return to presenting the media program, after presenting an advertisement, at a point seven minutes, fifty-six seconds, and 333 milliseconds into the presentation of the media program.

As mentioned, optimization facility 102 may analyze a second media file comprising the media program encoded in a second media format. For example, optimization facility 102 may analyze the second media file to identify a set of key frames within the second media file.

Optimization facility 102 may analyze the second media file in any suitable way. For example, optimization facility 102 may scan the contents of the second media file to identify all key frames in the second media file. Optimization facility 102 may scan the file in any suitable way, such as by examining data representing each actual frame of the second media file to determine if the frame is a key frame. Additionally or alternatively, optimization facility 102 may scan only portions of the second media file representing actual frames within a certain time in advance of and/or following the playback return position to determine if the scanned portions include one or more key frames. If a frame is determined to be a key frame, optimization facility 102 may add the frame to a set of identified key frames associated with the second media file. Additionally or alternatively, optimization facility 102 may analyze the second media file by receiving and/or analyzing metadata associated with the second media file to retrieve a predefined set of key frames and/or a key frame interval (e.g., data indicating that a particular media file has key frames at every 0.005 seconds of playback time) that may be used by optimization facility 102 to identify a set of key frames in the second media file without examining the data representing each actual frame of the second media file.

As mentioned, optimization facility 102 may select, based on the advertisement insertion signaling point for the first media file, a key frame in the second media file. For example, optimization facility 102 may select a particular key frame from the identified set of key frames of the second media file. Optimization facility 102 may select any key frame in the second media file based on a key frame selection heuristic, which may specify a set of one or more factors to be used by optimization facility 102 may make a selection. For example, the key frame selection heuristic may specify that a selection is to be based on a temporal distance of a playback return position in an accessed signaling point to the immediately preceding key frame, a temporal distance of the playback return position in an accessed signaling point to the immediately following key frame, a temporal distance between a playback breakaway position and a playback return position in an accessed signaling point, a comparison of the temporal distances of the playback breakaway position and the playback return position in an accessed signaling point to the immediately preceding and following key frames, the content represented by the data within the media file between the playback breakaway position and the playback return position in the accessed signaling point, any other suitable factor, or any combination or sub-combination of such factors.

In some examples, the selecting of the key frame by optimization facility 102 may include optimization facility 102 identifying a key frame in the set of key frames that immediately precedes a temporal position of a playback return position in a media file. Optimization facility 102 may identify an immediately preceding key frame in any suitable way. For example, each identified key frame (e.g., each IDR frame) may have an associated PTS. Optimization facility 102 may compare the playback return position with each PTS associated with each identified key frame in the set of identified key frames, and thereby identify a key frame in the set of key frames that immediately precedes the playback return position. Upon identifying the key frame in the set of key frames that immediately precedes the playback return position, optimization facility 102 may then select the identified key frame as the key frame that immediately precedes the playback return position.

In some examples, the selecting of the key frame by optimization facility 102 may include optimization facility 102 identifying a key frame in the set of key frames that immediately follows a temporal position of a playback return position in a media file. Optimization facility 102 may identify an immediately following key frame in any suitable way. For example, each identified key frame (e.g., each IDR frame) may have an associated PTS. Optimization facility 102 may compare the playback return position with each PTS associated with each identified key frame in the set of identified key frames, and thereby identify a key frame in the set of key frames that immediately follows the playback return position. Upon identifying the key frame in the set of key frames that immediately follows the playback return position, optimization facility 102 may then select the identified key frame as the key frame that immediately follows the playback return position.

Selection of a key frame that immediately follows the playback return position may allow a DAI system to avoid presenting media content that a media content distributor desires to omit from a presentation of a media program during a DAI operation. For example, a media program may include built-in advertising content (e.g., media content included in the media file data stream that includes advertising, such as advertising content inserted in the media file data stream by a provider of the media file data stream and/or a producer of a media program carried by the media file data stream) that the media content distributor does not want to present to a user. In such scenarios, optimization facility 102 may select a key frame that immediately follows the playback return position, which selection may facilitate the undesired media content from being presented during a presentation of the media program when the DAI operation is performed and the second media file is used for the presentation.

In certain examples, the selecting by the optimization facility 102 of a key frame may include optimization facility 102 determining whether a media program includes media content, such as a built-in advertisement, that the media content distributor wants omitted from a presentation of the media program. The determination may be performed by optimization facility 102 in any suitable way. For example, optimization facility 102 may determine whether the playback return position temporally follows the playback breakaway position by at least a predetermined amount of time. The predetermined amount of time may be any suitable amount of time defined in advance of optimization facility 102 performing operations to select a key frame. For example, the predetermined amount of time may be defined to represent a length of time that is indicative of advertising content, such a length of time commonly used for advertisements and/or advertisement breaks (e.g., thirty seconds, one minute, etc.). As another example, the predetermined amount of time may be set to be a certain percentage of the running time of the media program.

In certain examples, upon determining that the playback return position does not follow the playback breakaway position by at least the predetermined amount of time, optimization facility 102 may identify a key frame in the identified set of key frames that immediately precedes the playback return position, and select the identified key frame that immediately precedes the playback return position. Alternatively, upon determining that the playback return position follows the playback breakaway position by at least the predetermined amount of time (which may be indicative of built-in advertising content in the media program), optimization facility 102 may identify a key frame in the identified set of key frames that immediately follows the playback return position, and select the identified key frame that immediately follows the playback return position.

As mentioned, optimization facility 102 may generate, based on the selected key frame in the second media file, data representative of a new advertisement insertion signaling point for the second media file. Optimization facility 102 may generate data representative of the new signaling point for the second media file in any suitable way. For example, optimization facility 102 may generate data representative of a new advertisement insertion signaling point that indicates a new playback return position at which playback of the media program is to be resumed following insertion of an advertisement in the media program when the second media file is used for playback of the media program.

In certain examples, optimization facility 102 may generate the new playback return position to temporally precede the selected key frame by at most a predetermined amount of time. The predetermined amount of time may represent an amount of time in advance of a key frame that playback may resume, following insertion of an advertisement, without causing presentation of undesirable content. The predetermined amount of time may be any amount of time that suits a particular implementation. In certain examples, the predetermined amount of time may vary depending on the media format used for playback of the media program. For example, the predetermined amount of time may be 100 milliseconds for a media file coded in an MPEG-2 media format. Likewise, the predetermined amount of time may be 200 milliseconds for a media file coded in an MPEG-4 media format. The amount of time may be calculated by optimization facility 102, or may be determined by a user of DAI optimization system 100. In some implementations, the predetermined amount of time may be a zero and/or null value.

To illustrate one example, optimization facility 102 may select an IDR frame included in a media file coded in an MPEG-4 format and that is temporally located at a PTS of 00:07:56.330. In this example, the optimum amount of time preceding an IDR frame for playback to begin for a particular media system and media file format may be predetermined to be 0.008 milliseconds. Optimization facility 102 may therefore calculate that the optimum playback return position at which to resume playback of the media file after DAI is 00:07:56.322. Optimization facility 102 may then generate data representative of a new advertisement insertion signaling point that indicates a new playback return position of 00:07:56.322.

While certain examples are described herein in reference to generating a new playback return position, additionally or alternatively, optimization facility 102 may generate a new advertisement insertion signaling point that may indicate a new playback breakaway position at which playback of the media program is to cease prior to insertion of an advertisement in the media program when an associated media file is used for playback of the media program. The new playback breakaway position may be generated in any of the ways described herein and/or may be the same as or different from the playback breakaway position of the advertisement insertion signaling point.

In some embodiments, optimization facility 102 may record the generated data representative of the new advertisement insertion signaling point associated with the second media file in a new signaling point reference data record associated with the second media file. Optimization facility 102 may record the generated data in any suitable way to any suitable medium. In some implementations, optimization facility 102 may create and store a new signaling point reference data record in storage facility 104. For example, optimization facility 102 may create and store, in storage facility 104, a new signaling point reference data record "CSV$_1$" associated with the second media file. Optimization facility 102 may record the new advertisement insertion signaling point in the new signaling point reference data record for use by a DAI system to apply DAI when the second media file is used for presentation of the media program.

Figure 2:
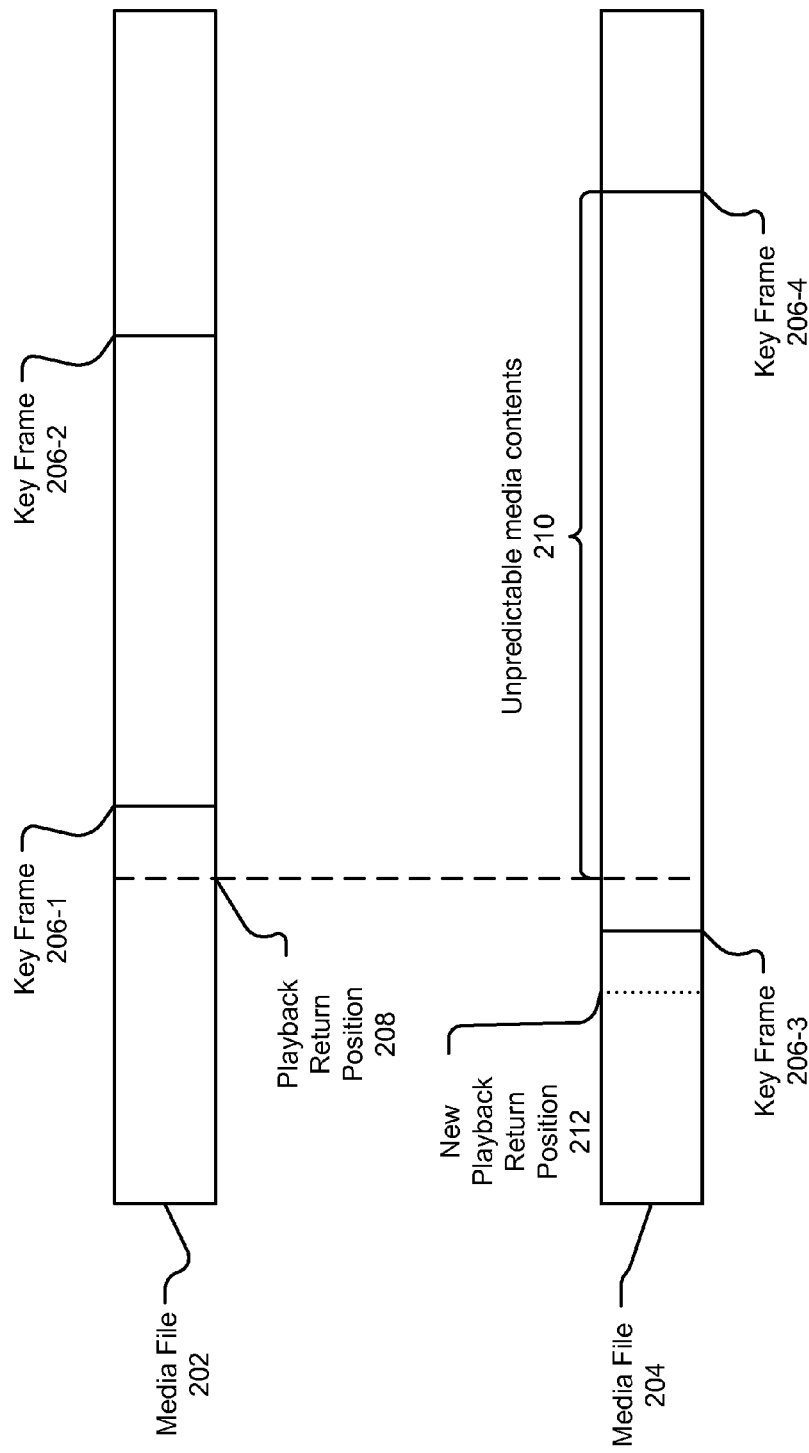
FIGS. 2-4 illustrate examples of optimization of a signaling point for a media file according to principles described herein.

FIG. 2 illustrates an example of optimization of a signaling point for a media file. In FIG. 2, a media file 202 represents a first media file containing a media program encoded in a first coding format (e.g., MPEG-2), and a media file 204 represents a second media file containing the same media program encoded in a second media coding format (e.g., MPEG-4). Key frames 206 (e.g., key frames 206-1 through 206-4) represent key frames within media files 202 and 204.

Key frames 206-1 and 206-2 of media file 202 may be similar to or different from key frames 206-3 and 206-4 of media file 204. For example, key frames 206-1 and 206-2 may be I-frames used in an MPEG-2 format, and key frames 206-3 and 206-4 may be IDR frames used in an MPEG-4 format. Key frames 206-1 and 206-2 may be predictably positioned within media file 202 (e.g., every fixed number of frames) in accordance with an MPEG-2 format specification, while frames 206-3 and 206-4 may be unpredictably positioned within media file 204 in accordance with an MPEG-4 format specification.

Playback return position 208 represents an optimum playback return position for a DAI system to resume playback of the media program encoded in media file 202 after inserting an advertisement into a presentation of the media program when the media program is presented using media file 202. As shown in FIG. 2, playback return position 208 may be temporally positioned a certain amount of time in advance of key frame 206-1. The certain amount of time in advance of key frame 206-1 may be an optimum amount of time that accounts for processing of the media stream that may be necessary to begin presentation of the media program encoded in media file 202 at or near key frame 206-1. In some instances, this optimum time may be zero seconds and/or a null value. When playback of the media program is started at playback return position 208 (e.g., resumed at playback return position 208 after presentation of an inserted advertisement), a presentation of digital content (e.g., a presentation of the media program with the advertisement inserted therein) may be continuous or nearly continuous, and may be uninterrupted by undesirable content (e.g., frozen, incomplete, and/or distorted video and/or audio content).

Although playback return position 208 may represent an optimum playback return position for media file 202, playback return position 208 may not represent an optimum playback return position for media file 204. As shown in FIG. 2, playback return position 208 temporally follows key frame 206-3 and is not within an optimum amount of time preceding the next subsequent key frame 206-4 in media file 204. Consequently, if a DAI system starts playback of the media program encoded in media file 204 at playback return position 208 when media file 204 is used for playback of the media program (e.g., by resuming playback at playback return position 208 after insertion of an advertisement), a presentation of digital content (e.g., a presentation of the media program with the advertisement inserted therein) may not be continuous or nearly continuous and/or may be interrupted by presentation of undesirable content (e.g., frozen, incomplete, and/or distorted video and/or audio content). This undesirable content may be presented because the media content encoded within media file 204 between playback return position 208 and the temporally next key frame, key frame 206-4, may not be predictable by the DAI system and/or a media presentation system. For example, unpredictable media contents 210 may include media data that may not be accurately decoded (e.g., by a media codec) without reference to a previous portion of the coded media stream, such as key frame 206-3. Thus, when playback starts at playback return position 208 in media file 204, undesirable content may be presented and continue until playback reaches key frame 206-4, where effective decoding of media file 204 and proper presentation of the media program may resume.

To prevent such an undesirable presentation of digital content using media file 204, optimization facility 102 may generate, in any of the ways described herein, a new playback return position 212 that is within an optimum time preceding key frame 206-3. As shown in FIG. 2, playback return position 208 temporally follows key frame 206-3, and new playback return position 212 temporally precedes the key frame 206-3. When media file 204 is used for playback of the media program and the playback of the media program is started (e.g., resumed) at new playback return position 212 that is within an optimum time preceding key frame 206-3, a presentation of undesirable content may be avoided because key frame 206-3 may be decoded independently of any other portion of the media stream, and the media content between key frames 206-3 and 206-4 may be accurately decoded with reference to key frame 206-3. The optimum time may be in advance of key frame 206-3 to account for processing of the media stream that may be necessary to begin presentation of the media content in media file 204 at key frame 206-3. The optimum time for media file 202 may be the same or different from the optimum time for media file 204.

Figure 3:
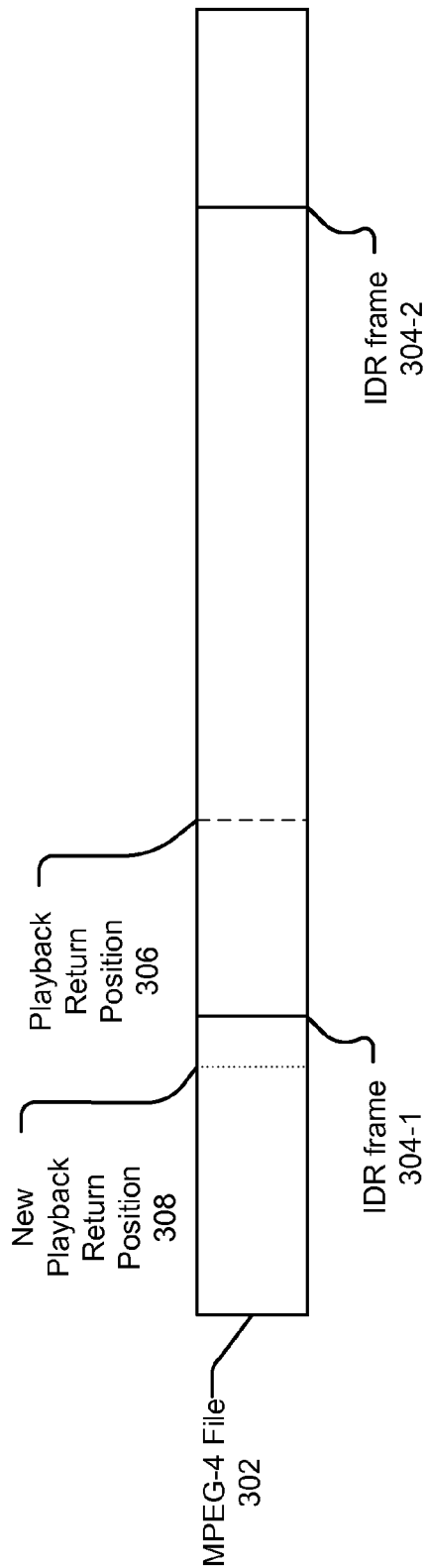

FIG. 3 illustrates an example of optimization of a signaling point for an MPEG-4 file. More specifically, FIG. 3 illustrates an example of optimization facility 102 selecting, within an MPEG-4 file, an IDR frame that immediately precedes a playback return position. MPEG-4 file 302 represents a media file including a media program encoded in an MPEG-4 format. Optimization facility 102 may analyze MPEG-4 file 302 as described herein to identify a set of IDR frames that includes IDR frames 304 (e.g., IDR frames 304-1 and 304-2). Playback return position 306 represents a playback return position indicated by an advertisement insertion signaling point accessed by optimization facility 102, and indicates a playback return position at which playback of a media program is to be resumed following DAI when a media file including the media program encoded in an MPEG-2 format is used for playback of the media program.

In this illustration, optimization facility 102 identifies, within the identified set of IDR frames, IDR frame 304-1 as the IDR frame that immediately precedes playback return position 306. Optimization facility 102 then selects IDR frame 304-1 and generates data representative of a new advertisement insertion signaling point that indicates a new playback return position 308 that temporally precedes IDR frame 304-1 by a predetermined amount of time.

In certain examples, optimization facility 102 may select IDR frame 304-1 that immediately precedes playback return position 306 based on a determination that the media program in MPEG-4 file does not include undesirable content such as built-in advertising content between a playback breakaway position and playback return position 306. As described above, for example, optimization facility 102 may determine that an amount of time between the playback breakaway position and playback return position 306 is less than a predetermined amount of time and, in response, may identify and select IDR frame 304-1 that immediately precedes playback return position 306.

Figure 4:
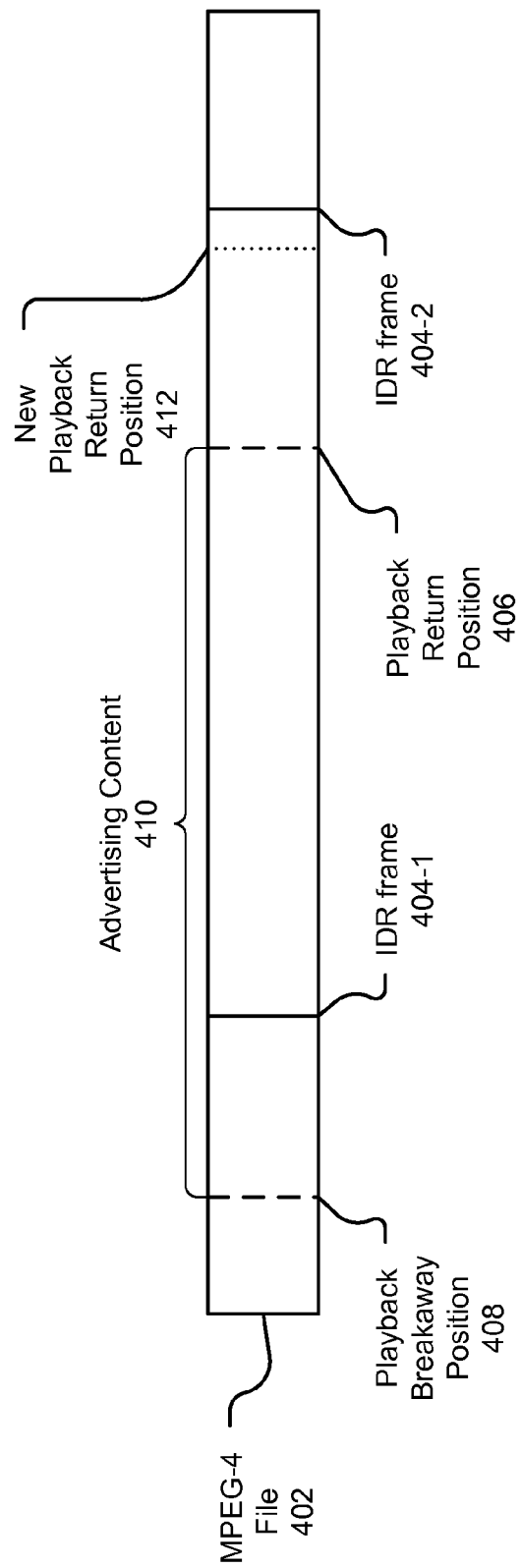

FIG. 4 illustrates another example of optimization of a signaling point for an MPEG-4 file. More specifically, FIG. 4 illustrates an example of optimization facility 102 selecting, within an MPEG-4 file, an IDR frame that immediately follows a playback return position. MPEG-4 file 402 represents a media file containing a media program encoded in an MPEG-4 format. Optimization facility 102 may analyze MPEG-4 file 402 as described herein to identify a set of IDR frames that includes IDR frames 404 (e.g., IDR frame 404-1, IDR frame 404-2). Playback return position 406 represents a playback return position indicated by an advertisement insertion signaling point accessed by optimization facility 102. Playback breakaway position 408 represents a playback breakaway position indicated by the advertisement insertion signaling point accessed by optimization facility 102. The advertisement insertion signaling point accessed by optimization facility 102 in this illustration is associated with a media file comprising the media program encoded in an MPEG-2 media format. Advertising content 410 represents built-in advertising content included in the media program encoded in MPEG-4 file 402.

Optimization facility 102 may determine that playback return position 406 temporally follows playback breakaway position 408 by at least a predetermined amount of time (e.g., thirty seconds). Based on this determination, optimization facility 102 may identify the key frame in the identified set of key frames that immediately follows playback return position 408—in this case, IDR frame 404-2—and generate data representative of a new advertisement insertion signaling point that indicates new playback return position 412. New playback return position 412 precedes IDR frame 404-2 by at most a predetermined amount of time (e.g., 0.008 seconds). When MPEG-4 file 402 is used for playback of the media program, the new signaling point may cause the DAI system to cease playback at playback breakaway position 408 and resume playback at new playback return position 412, causing advertising content 410 to be skipped (e.g., not presented).

Figure 5:
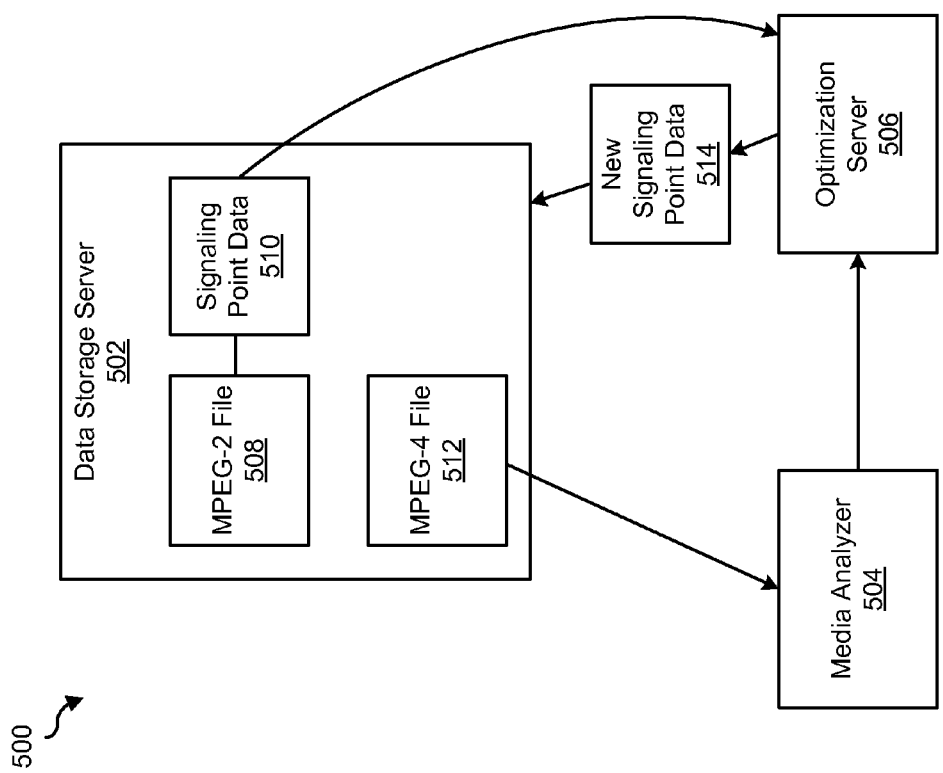
FIG. 5 illustrates an exemplary implementation of the system of FIG. 1 according to principles described herein.

FIG. 5 shows an exemplary implementation 500 of system 100. As shown, implementation 500 may include a data storage server 502, a media analyzer 504, and an optimization server 506. In implementation 500, one or more of facilities 102 and 104 of system 100 may be implemented entirely by data storage server 502, media analyzer 504, or optimization server 506, or distributed across any combination or sub-combination of data storage server 502, media analyzer 504, and optimization server 506 in any suitable manner.

Data storage server 502, media analyzer 504, and optimization server 506 may communicate using any communication platforms and technologies suitable for transporting data and/or communication signals, including known communication technologies, devices, media, and protocols supportive of remote communications, examples of which include, but are not limited to, data transmission media, communications devices, Internet Protocol ("IP"), Transmission Control Protocol ("TCP"), User Datagram Protocol ("UDP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Long Term Evolution ("LTE") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

Data storage server 502 may include any suitable data storage medium and/or device including, but not limited to, a hard disk drive, a computer memory, and a network attached storage device. As shown in FIG. 5, data storage server 502 stores an MPEG-2 file 508, signaling point data 510, and an MPEG-4 file 512. MPEG-2 file 508 represents a media file including a media program encoded in an MPEG-2 format. Signaling point data 510 includes data representative of one or more advertising insertion signaling points associated with MPEG-2 file 508. Data storage server 502 may store signaling point data 510 as a signaling point data record, which may include one or more CSV files. MPEG-4 file 512 represents a media file including the same media program as media file 508 but encoded in a second media format (e.g., MPEG-4). In some instances, MPEG-4 file 512 may be a file generated by transcoding MPEG-2 file 508 into an MPEG-4 coding format. New signaling point data 514 includes data representative of one or more new advertisement insertion signaling points that may be generated by optimization server 506 in accordance with the principles described herein.

Media analyzer 504 represents any hardware and/or software capable of analyzing MPEG-4 file 512 according to the principles described herein. For example, media analyzer 504 may scan MPEG-4 file 512 to identify a set of key frames within MPEG-4 file 512. Additionally or alternatively, media analyzer 504 may receive and/or analyze metadata associated with MPEG-4 file 512 to identify a set of key frames within MPEG-4 file 512. Media analyzer 504 may provide data representing the identified set of key frames to optimization server 506.

In accordance with the methods and systems described herein, optimization server 506 may access signaling point data 510 from data storage server 502. Optimization server 506 may also direct media analyzer 504 to analyze MPEG-4 file 512 and to transmit data representative of an identified set of IDR frames in MPEG-4 file 512 to optimization server 506. Based on signaling point data 510, optimization server 506 may select a key frame from within the set of key frames identified by media analyzer 504, and generate new signaling point data 514, such as described herein. In some implementations, optimization server 506 may provide new signaling point data 514 to data storage server 502, which may then record new signaling point data 514. Data storage server 502 may record and/or maintain signaling point data as a signaling point reference record associated with MPEG-4 file 512. This may allow a DAI system to utilize new signaling point data 514 when presenting the media program using MPEG-4 file 512.

Figure 6:
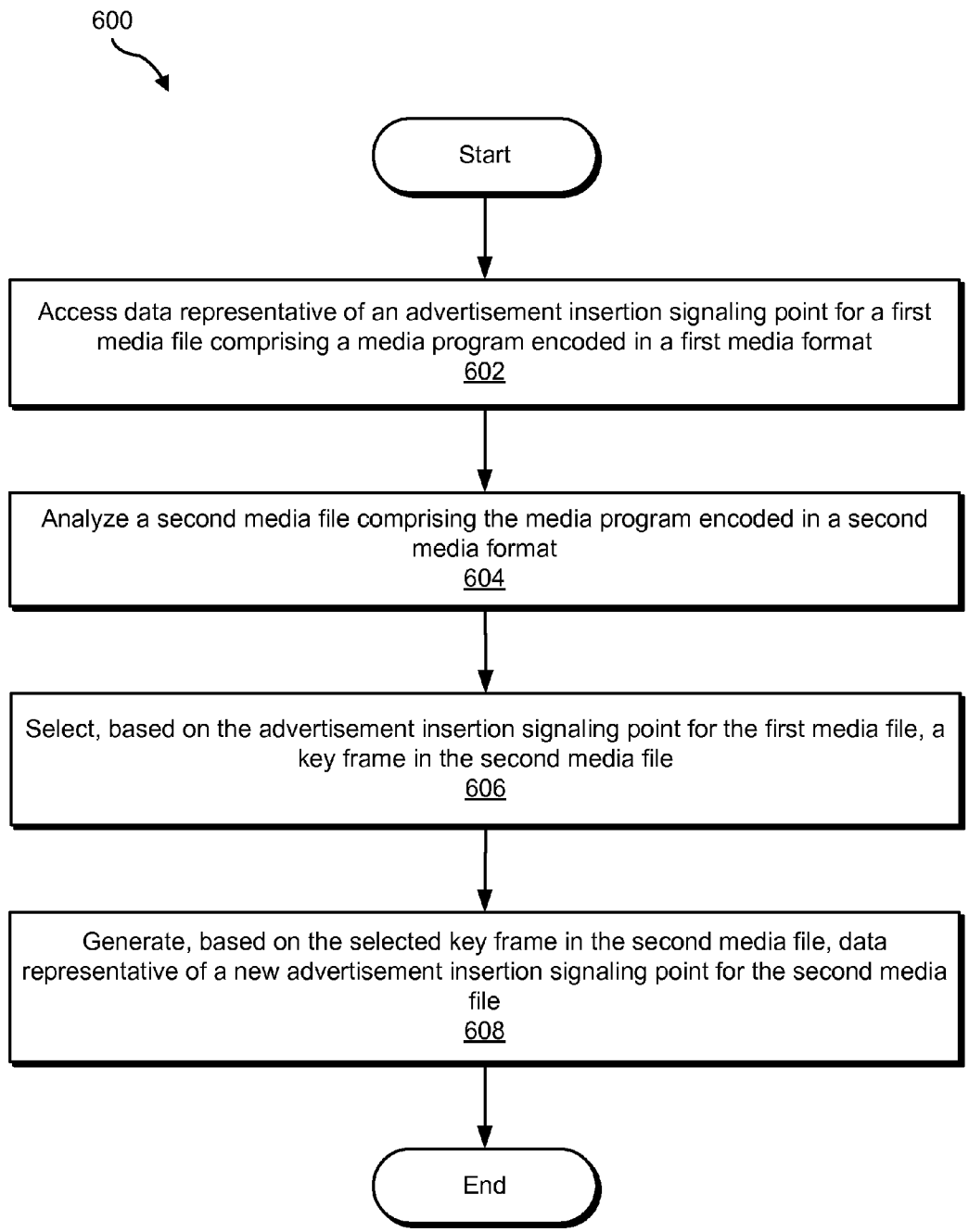
FIGS. 6-7 illustrate exemplary methods of optimizing DAI advertisement insertion signaling points according to principles described herein.
Figure 7:
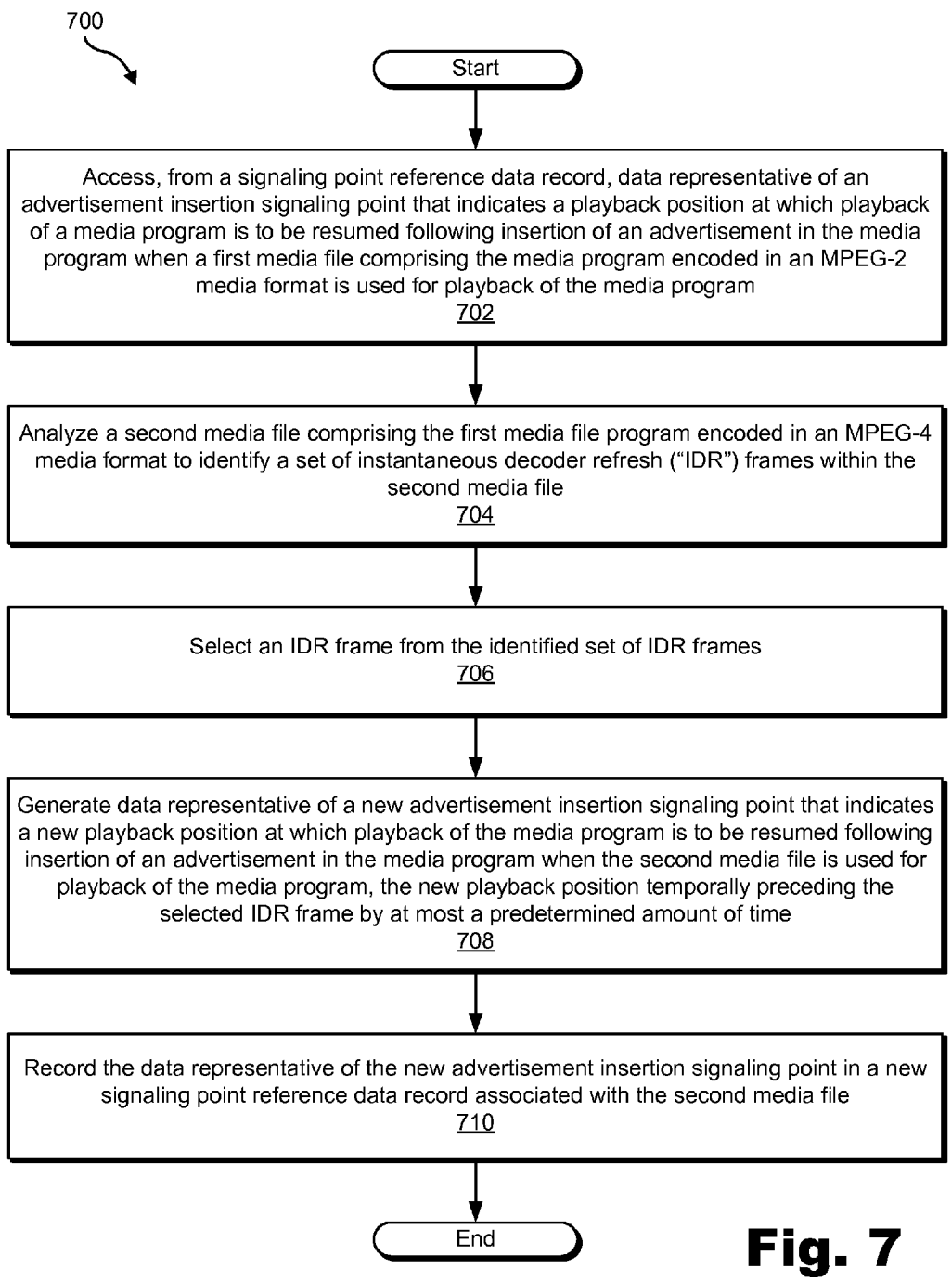

FIGS. 6-7 illustrate exemplary signaling point optimization methods 600 and 700 according to principles described herein. While FIGS. 6-7 illustrate exemplary operations according to certain embodiments, other embodiments may omit, add to, reorder, combine, and/or modify any of the operations shown in FIGS. 6-7. In certain embodiments, one or more of the operations shown in FIGS. 6-7 may be performed by system 100 and/or one or more components or implementations of system 100.

In operation 602 of FIG. 6, a DAI optimization system accesses data representative of an advertisement insertion signaling point for a first media file comprising a media program encoded in a first media format. For example, the DAI optimization system may access data representative of an advertisement insertion signaling point that indicates a playback return position at which playback of a media program is to be resumed following insertion of an advertisement in the media program when a first media file comprising the media program encoded in a first media format is used for playback of the media program. Operation 602 may be performed in any of the ways described herein.

In operation 604, the DAI optimization system analyzes a second media file comprising the media program encoded in a second media format. For example, the DAI optimization system may analyze a second media file comprising the media program encoded in a second media format to identify a set of key frames within the second media file. Operation 604 may be performed in any of the ways described herein.

In operation 606, the DAI optimization system selects, based on the advertisement insertion signaling point for the first media file, a key frame in the second media file. For example, the DAI optimization system may select, based on the data representative of the advertisement insertion signaling point, a key frame from the identified set of key frames. Operation 606 may be performed in any of the ways described herein.

In operation 608, the DAI optimization system generates, based on the selected key frame in the second media file, data representative of a new advertisement insertion signaling point for the second media file. For example, the DAI optimization system may generate data representative of a new advertisement insertion signaling point that indicates a new playback return position at which playback of the media program is to be resumed following insertion of an advertisement in the media program when the second media file is used for playback of the media program. In certain examples, the new playback return position may temporally precede the selected key frame by at most a predetermined amount of time. Operation 608 may be performed in any of the ways described herein.

In operation 702 of FIG. 7, a DAI optimization system accesses, from a signaling point reference data record, data representative of an advertisement insertion signaling point that indicates a playback return position at which playback of a media program is to be resumed following insertion of an advertisement in the media program when a first media file comprising the media program encoded in an MPEG-2 media format is used for playback of the media program. Operation 702 may be performed in any of the ways described herein.

In operation 704, the DAI optimization system analyzes a second media file comprising the first media file program encoded in an MPEG-4 media format to identify a set of IDR frames within the second media file. Operation 704 may be performed in any of the ways described herein.

In operation 706, the DAI optimization system selects, from the identified set of IDR frames, an IDR frame in the second media file. For example, the DAI optimization system may select an IDR frame that immediately precedes or immediately follows the playback return position. Operation 706 may be performed in any of the ways described herein.

In operation 708, the DAI optimization system generates data representative of a new advertisement insertion signaling point that indicates a new playback return position at which playback of the media program is to be resumed following insertion of an advertisement in the media program when the second media file is used for playback of the media program, the new playback return position temporally preceding the selected IDR frame by at most a predetermined amount of time. Operation 708 may be performed in any of the ways described herein.

In operation 710, the DAI optimization system records the data representative of the new advertisement insertion signaling point in a new signaling point reference data record associated with the second media file. Operation 710 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically Erasable PROM (FLASH-EEPROM), any other memory chip or cartridge, or any other tangible medium from which a computer may read.

Figure 8:
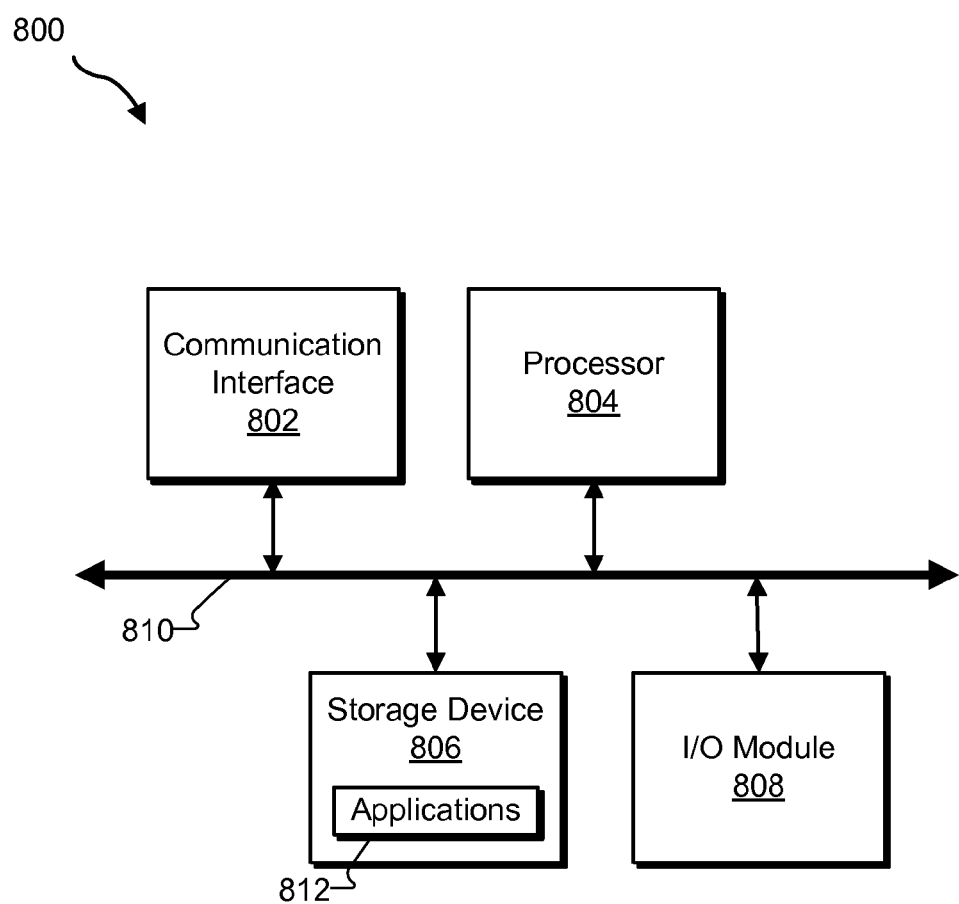
FIG. 8 illustrates an exemplary computing device according to principles described herein.

FIG. 8 illustrates an exemplary computing device 800 that may be configured to perform one or more of the processes described herein. As shown in FIG. 8, computing device 800 may include a communication interface 802, a processor 804, a storage device 806, and an input/output (I/O) module 808 communicatively connected via a communication infrastructure 810. While an exemplary computing device 900 is shown in FIG. 8, the components illustrated in FIG. 8 are not intended to be limiting. Additional or alternative components may be used in other embodiments. For example, in addition or alternative to being communicatively connected by way of communication infrastructure 810, one or more components of computing device 800 may be communicatively connected by way of one or more other suitable interfaces. For instance, communication interface 802, storage device 806, I/O module 808, and/or any other components of computing device 800 may be communicatively coupled directly to processor 804 via one or more interfaces (e.g., discrete interfaces). Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, and any other suitable interface. In at least one embodiment, communication interface 802 may provide a direct connection between system 100 and one or more of provisioning systems via a direct link to a network, such as the Internet. Communication interface 802 may additionally or alternatively provide such a connection through, for example, a local area network (such as an Ethernet network), a personal area network, a telephone or cable network, a satellite data connection, a dedicated URL, or any other suitable connection. Communication interface 802 may be configured to interface with any suitable communication media, protocols, and formats, including any of those mentioned above.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 806. For example, data representative of one or more executable applications 812 (which may include, but are not limited to, one or more of the software applications described herein) configured to direct processor 804 to perform any of the operations described herein may be stored within storage device 806. In some examples, data may be arranged in one or more databases residing within storage device 806.

I/O module 808 may be configured to receive user input and provide user output and may include any hardware, firmware, software, or combination thereof supportive of input and output capabilities. For example, I/O module 808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 800. For example, one or more applications 812 residing within storage device 806 may be configured to direct processor 804 to perform one or more processes or functions associated with system 100 or any components thereof.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary implementations have been described with reference to the accompanying drawings. It will, however, be evident that various modifications and changes may be made thereto, and additional implementations may be provided, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A method comprising:
    accessing, by a digital advertisement insertion ("DAI") optimization system, data representative of an advertisement insertion signaling point that indicates a playback return position at which playback of a media program is to be resumed following insertion of an advertisement in the media program when a first media file comprising the media program encoded in a first media format is used for playback of the media program;
    analyzing, by the DAI optimization system, a second media file comprising the media program encoded in a second media format to identify a set of key frames within the second media file, each key frame in the identified set of key frames decodable by a media decoder without reference to another frame in the second media file;
    selecting, by the DAI optimization system based on the data representative of the advertisement insertion signaling point, a key frame from the identified set of key frames; and
    generating, by the DAI optimization system, data representative of a new advertisement insertion signaling point that indicates a new playback return position at which playback of the media program is to be resumed following insertion of an advertisement in the media program when the second media file is used for playback of the media program, the new playback return position temporally preceding the selected key frame, the new playback return position temporally preceding the selected key frame by at most a predetermined amount of time.

2. The method of claim 1, wherein the first media format is an MPEG-2 media format and the second media format is an MPEG-4 media format.

3. The method of claim 2, wherein the key frames comprise instantaneous decoder refresh frames.

4. The method of claim 1, wherein the playback return position indicated by the advertisement insertion signaling point temporally follows the selected key frame.

5. The method of claim 1, wherein the selecting of the key frame from the identified set of key frames comprises:
    identifying a key frame in the set of key frames that immediately precedes the playback return position; and
    selecting the identified key frame that immediately precedes the playback return position.

6. The method of claim 1, wherein the data representative of the advertisement insertion signaling point further indicates a playback breakaway position at which playback of the media program is to cease prior to insertion of an advertisement in the media program when the first media file is used for playback of the media program.

7. The method of claim 6, wherein the selecting of the key frame from the identified set of key frames comprises:
    determining whether the playback return position temporally follows the playback breakaway position by at least a second predetermined amount of time;
    upon determining that the playback return position does not follow the playback breakaway position by at least the second predetermined amount of time,
        identifying a key frame in the identified set of key frames that immediately precedes the playback return position, and
        selecting, from the identified set of key frames, the identified key frame that immediately precedes the playback return position; and
    upon determining that the playback return position follows the playback breakaway position by at least the second predetermined amount of time,
        identifying a key frame in the identified set of key frames that immediately follows the playback return position, and
        selecting, from the identified set of key frames, the identified key frame that immediately follows the playback return position.

8. The method of claim 6, wherein the new advertisement insertion signaling point further indicates a new playback breakaway position at which playback of the media program is to cease prior to insertion of an advertisement in the media program when the second media file is used for playback of the media program.

9. The method of claim 1, wherein the selected key frame is one of:
    a key frame in the identified set of key frames that immediately precedes the playback return position; and
    a key frame in the identified set of key frames that immediately follows the playback return position.

10. The method of claim 1, wherein:
    the accessing of the data representative of the advertisement insertion signaling point comprises accessing the data representative of the advertisement insertion signaling point from a signaling point reference data record associated with the first media file; and the method further comprises recording, by the DAI optimization system, the data representative of the new advertisement insertion signaling point in a new signaling point reference data record associated with the second media file.

11. The method of claim 1, embodied as computer-executable instructions on at least one non-transitory computer-readable medium.

12. The system of claim 1, wherein each key frame in the identified set of key frames comprises one of:
an intra-frame;
an I-Frame;
an IDR frame; and
an I-Slice.

13. A method comprising:
accessing, by a digital advertisement insertion ("DAI") optimization system from a signaling point reference data record, data representative of an advertisement insertion signaling point that indicates a playback return position at which playback of a media program is to be resumed following insertion of an advertisement in the media program when a first media file comprising the media program encoded in an MPEG-2 media format is used for playback of the media program;

analyzing, by the DAI optimization system, a second media file comprising the first media file transcoded in an MPEG-4 media format to identify a set of instantaneous decoder refresh ("IDR") frames within the second media file;

selecting, by the DAI optimization system, an IDR frame, from the identified set of IDR frames, that immediately precedes the playback return position;

generating, by the DAI optimization system, data representative of a new advertisement insertion signaling point that indicates a new playback return position at which playback of the media program is to be resumed following insertion of an advertisement in the media program when the second media file is used for playback of the media program, the new playback return position temporally preceding the selected IDR frame, the new playback return position temporally preceding the selected IDR frame by at most a predetermined amount of time; and recording, by the DAI optimization system, the data representative of the new advertisement insertion signaling point in a new signaling point reference data record associated with the second media file.

14. The method of claim 13, embodied as computer-executable instructions on at least one non-transitory computer-readable medium.

15. A system comprising:
at least one physical computing device that:
accesses data representative of an advertisement insertion signaling point that indicates a playback return position at which playback of a media program is to be resumed following insertion of an advertisement in the media program when a first media file comprising the media program encoded in a first media format is used for playback of the media program;
analyzes a second media file comprising the media program encoded in a second media format to identify a set of key frames within the second media file, each key frame in the set of identified key frames decodable by a media decoder without reference to another frame in the second media file;
selects, based on the data representative of the advertisement insertion signaling point, a key frame from the identified set of key frames within the second media file; and
generates data representative of a new advertisement insertion signaling point that indicates a new playback return position at which playback of the media program is to be resumed following insertion of an advertisement in the media program when the second media file is used for playback of the media program, the new playback return position temporally preceding the selected key frame, the new playback return position temporally preceding the selected key frame by at most a predetermined amount of time.

16. The system of claim 15, wherein:
the first media format is an MPEG-2 media format;
the second media format is an MPEG-4 media format; and
the key frames are instantaneous decoder refresh frames.

17. The system of claim 15, wherein the playback return position indicated by the advertisement insertion signaling point temporally follows the selected key frame.

18. The system of claim 15, wherein the at least one physical computing device selects the key frame from the identified set of key frames within the second media file by:
identifying a key frame in the set of key frames that immediately precedes the playback return position; and
selecting the identified key frame that immediately precedes the playback return position.

19. The system of claim 15, wherein:
the data representative of the advertisement insertion signaling point further indicates a playback breakaway position at which playback of the media program is to cease prior to insertion of an advertisement in the media program when the first media file is used for playback of the media program; and
the at least one physical computing device selects the key frame from the identified set of key frames by:
determining whether the playback return position temporally follows the playback breakaway position by at least a second predetermined amount of time;
upon determining that the playback return position does not follow the playback breakaway position by at least the second predetermined amount of time,
identifying a key frame in the identified set of key frames that immediately precedes the playback return position, and
selecting, from the identified set of key frames, the identified key frame that immediately precedes the playback return position; and
upon determining that the playback return position follows the playback breakaway position by at least the second predetermined amount of time,
identifying a key frame in the identified set of key frames that immediately follows the playback return position, and
selecting, from the identified set of key frames, the identified key frame that immediately follows the playback return position.

20. The system of claim 15, wherein the selected key frame is one of:
a key frame in the identified set of key frames that immediately precedes the playback return position; and
a key frame in the identified set of key frames that immediately follows the playback return position.

21. The system of claim 15, wherein:
the at least one physical computing device accesses the data representative of the advertisement insertion signaling point by accessing the data representative of the advertisement insertion signaling point from a signaling point reference data record associated with the first media file; and
the at least one physical computing device records the data representative of the new advertisement insertion signaling point in a new signaling point reference data record associated with the second media file.

* * * * *